Dec. 9, 1930.  A. SLATEN  1,784,255
MEASURING VALVE
Filed July 5, 1929   2 Sheets-Sheet 1
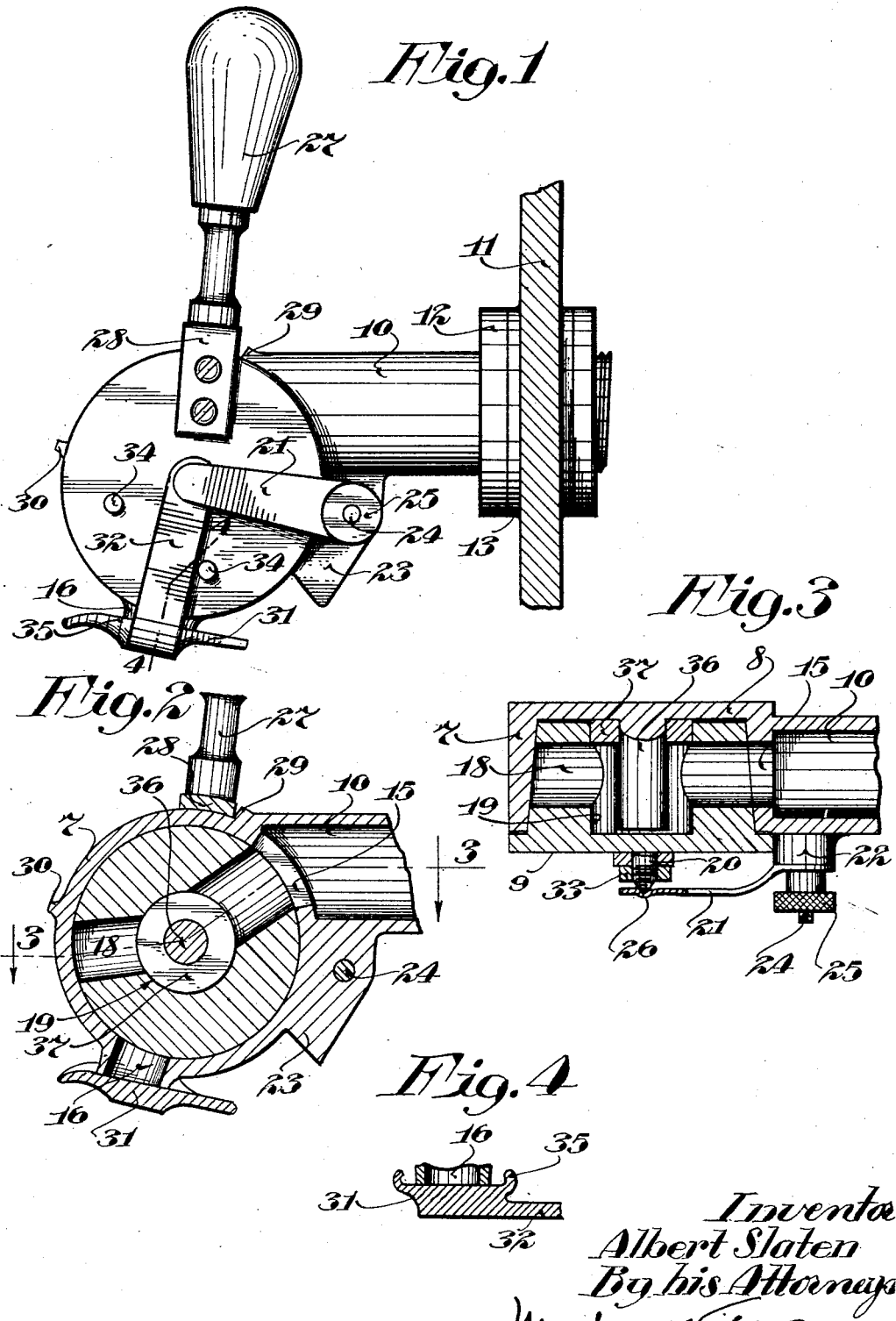
Inventor
Albert Slaten
By his Attorneys Dec. 9, 1930.  A. SLATEN  1,784,255
MEASURING VALVE
Filed July 5, 1929  2 Sheets-Sheet 2
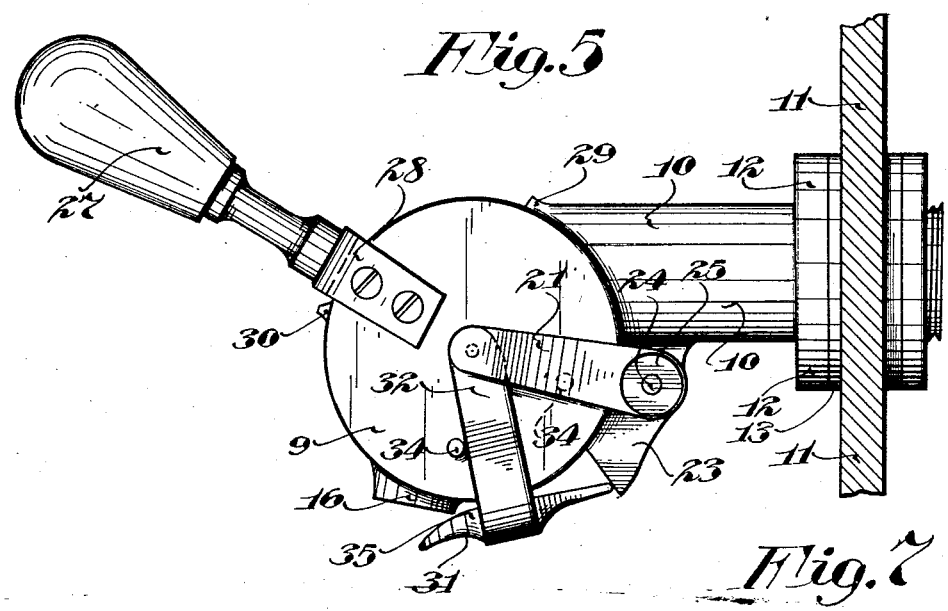
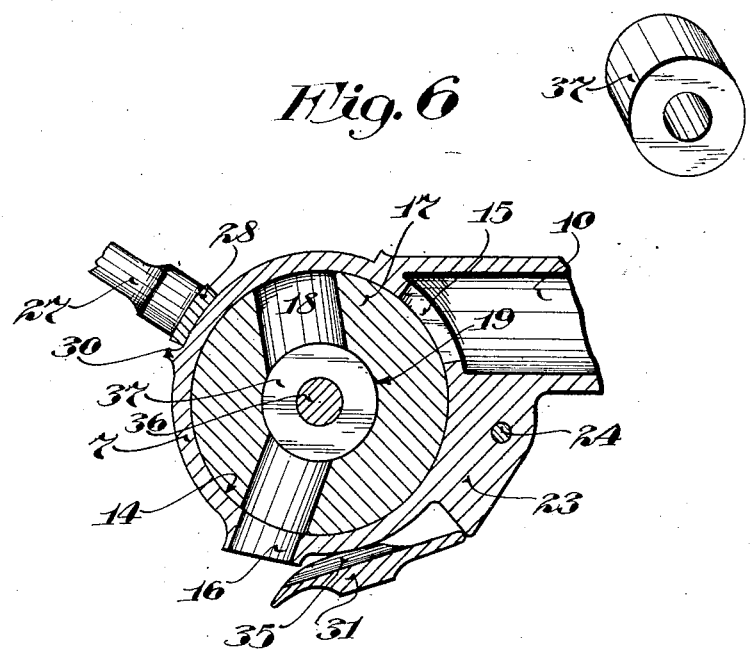
Inventor
Albert Slaten
By his Attorneys Patented Dec. 9, 1930

1,784,255

UNITED STATES PATENT OFFICE

ALBERT SLATEN, OF MINNEAPOLIS, MINNESOTA

MEASURING VALVE

Application filed July 5, 1929. Serial No. 375,973.

My present invention has for its object to provide an extremely simple and highly efficient measuring valve intended for general use but especially well adapted for use in connection with a cream dispenser for measuring cream for coffee in hotels, restaurants and the like.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a side elevation of the improved measuring valve;

Fig. 2 is a view principally in central vertical section;

Fig. 3 is a view principally in section taken on the irregular line 3—3 of Fig. 2;

Fig. 4 is a detail view in section taken on the line 4—4 of Fig. 1;

Fig. 5 is a view corresponding to Fig. 1 but showing the main and auxiliary valves open;

Fig. 6 is a view corresponding to Fig. 2 with the exception that the main and auxiliary valves are open; and Fig. 7 is a perspective view of one of the volume displacers.

The numeral 7 indicates a horizontally disposed cylindrical casing the left hand end of which is closed by an end plate 8 integral therewith and the right hand end thereof is open and normally closed by a removable end plate 9. This casing 7 is integrally formed above its horizontal axis with the outer end of a horizontal tubular neck 10 the upper surface of which is tangential to the top of said casing. Said neck 10 is rigidly secured to a liquid container 11, for holding a supply of cream or other liquid, by having its inner end portion inserted through a hole in said container and clamped thereto by a pair of opposing nuts 12 which have screw-threaded engagement with said neck. Pliable washers on the neck 10 are interposed between the container 11 and nuts 12 to form a liquid-tight joint between said container and neck.

Formed in the casing 7 concentric with its axis thereof is a cylindrical valve seat 14 which is tapered toward the end plate 8.

A port 15 in the casing 7 connects the interior thereof with the neck 10 and together with said neck forms an intake conduit through which the contents in the container 11 may flow to the interior of the casing 7. Formed in the bottom of the casing 7 is an externally bossed discharge passage 16 that is forwardly and downwardly inclined. A main valve 17 in the form of a tapered plug is mounted in the seat 14 and integrally formed with the end plate 9 in axial alignment therewith. In the main valve 17 is a measuring compartment 18 that extends radially through said valve and provided with an expanded cylindrical intermediate chamber 19 that is concentric with the axis of the main valve 17 and extends completely therethrough. The end portions of the measuring compartment 18 extend radially from the axis of the main valve 17 at an angle to each other and arranged to be successively brought into registration with the port 15 and discharge passage 16.

Fig. 2 shows the measuring compartment 18 in filling position in which its upper end portion is in registration with the port 15 and its lower end portion is out of registration with the discharge passage 16. The main valve 17 in Fig. 6 is adjusted to empty the measuring compartment 18 and in which position the upper end portion of said compartment is out of registration with the port 15 and said port closed by the main valve 17 and the lower end portion of said chamber is in registration with the discharge passage 16.

By reference to Fig. 3 it will be noted that the inner end of the valve is slightly out of contact with the end plate 8 and the end plate 9 is slightly out of contact with the adjacent edge of the casing 7 to permit inward axial movement of the main valve 17 in its seat 14 to compensate for wear and always form a liquid-tight joint between said valve and seat. At the axis of the end plate 9 is an outwardly projecting screw-threaded trunnion 20 having a conical outer end. A leaf spring 21 is provided for pressing the main valve 17 into its seat 14. This valve 17 is anchored in respect to the casing 7 by a boss 22, formed with a rib 23 on the back of the casing 7 and the under side of the neck 10, having a screw-threaded stud 24 which extends through a hole in said spring and has applied thereto a thumb-nut 25 which frictionally clamps the spring 21 onto the boss 22. The outer or free end of the spring 21 has formed therein a depressed seat 26 into which the conical outer end of the trunnion 20 extends.

A handle 27 is provided for oscillating the main valve 17 to alternately position the measuring compartment 18 in filling and emptying positions. This handle 27 is rigidly secured by an angle bracket 28 to the outer face of the end pate 9 which supports said handle substantially at the transverse center of the casing 7 in a position in which it projects radially from the axis thereof. A stop shoulder 29 on the neck 10 and a stop lug 30 on the casing 7 are arranged to be engaged by the horizontal portion of the angle bracket 28 and the former limits the closing movement of the main valve 17, as shown in Figs. 1 and 2, and the latter the opening movement thereof with the lower end portion of the filling compartment 18 in alignment with the discharge passage 16, see Figs. 5 and 6.

A non-drip auxiliary valve 31 is provided for closing the discharge passage 16 when the valve 17 is closed. This valve 31 is provided with a single contact face arranged to seat against the lower end of the boss surrounding the discharge passage 16 and close the same. The auxiliary valve 31 has a fixed arm 32 pivoted to the trunnion 20 and supports said valve for swinging movement circumferentially of the casing 7. A nut 33 on the trunnion 20 holds the arm 32 against lateral movement from the end plate 9.

The auxiliary valve 31 is opened and closed in timed relation to the main valve 17 during its oscillation by the handle 27 by a pair of circumferentially spaced pins 34 onto the end plate 9 arranged to alternately engage the arm 32 which extends therebetween. The spacing of the pins 34 is such that the main valve 17 has considerable movement in respect to the auxiliary valve 31 during its initial opening and closing movements. During the closing movement of the main valve 17 the lower end portion of the measuring compartment 18 is out of alignment with the discharge passage 16, or, in other words, the valve 17 is closed before the rear pin 34 engages the arm 32 and swings the valve 31 into a position to close said discharge passage. The valve 31 seats just prior to the engagement of the bracket 28 with the stop shoulder 29 and said shoulder limits the closing movement of the valve 31 with the measuring compartment 18 in filling position in which its upper end portion is aligned with the port 15. This stop shoulder 29 also prevents excess pressure from being applied to the handle 27 that would tend to spring the valve 31 by forcing the same too hard onto its seat. The purpose of this auxiliary valve 31 is to prevent the dripping of cream that might have accumulated in the discharge passage 16 after the valve 17 is closed.

During the opening of the valve 17 the same has considerable movement before the front pin 34 engages the arm 32 and opens said valve 31. The opening of the valve 31, however, is such that it is out of the way for the discharge of cream by the time the lower end portion of the measuring compartment 18 is in alignment with the discharge passage 16.

As shown, the auxiliary valve 31 is in the form of a trough and the upstanding side flanges 35 thereof prevent the flow of cream accumulated on the contact face of the valve 31 while the same is positioned to close the discharge passage 16 from the sides of said valve. This valve 31, when open, is in a downwardly and forwardly inclined position rearward of the discharge passage 16 and the accumulation of cream thereon will be discharged therefrom into a cup or other receptacle held under the discharge passage 16 to receive the cream from the measuring compartment 18. At the limit of the opening movement of the auxiliary valve 31 its rear end engages the lower end of the rib 23 as a stop. The purpose of the stop lug 30 is to limit the opening movement of the valve 17 and position the same with the lower end portion of the measuring compartment 18 in alignment with the discharge passage and also prevent excess pressure from being applied by the handle 27 that would tend to spring the parts operated thereby.

Formed with the inner face of the end plate 8 at the axis thereof is a cylindrical stud 36 which extends axially into the chamber 19 of the measuring compartment 18 and its outer end terminates short of the inner face of the end plate 9 so as to not interefere with the seating of the main valve 17 in its seat 14.

Interchangeably usable volume displacers 37 are provided for varying the capacity of the measuring compartment 18 and, as shown, are in the form of washers adapted to be removably mounted on the stud 36 and of substantially the same diameter as the chamber 19 with just enough clearance to permit free axial movement onto or off from said stud. The volume displacers 37 shown in Figs. 3 and 7 are of different sizes so that by the use of either one thereof the capacity of the measuring compartment 18 may be varied, at will. To apply one of the volume displacers 37 to the stud 36 it is only necessary to release the spring 21 from the trunnion 20 and swing the same rearward to permit axial movement of the end plate 9 and main valve 17 from the casing 7 to expose said stud. When removing the end plate 9 and valve 17 the auxiliary valve 31 must be positioned, as shown in Fig. 6, to permit its left hand flange 35 to clear the boss surrounding the passage 16.

From the above description it is evident that cream may be very quickly withdrawn from the container 11, measured and then discharged from the measuring compartment 18 into a cup or other receptacle held under the discharge passage 16. Furthermore, the main valve 17 and parts carried by the end plate 9 may be very easily and quickly detached from the casing 7 without the use of tools and the entire casing and valves cleansed and sterilized.

What I claim is:

1. A device of the class described comprising a valve casing having an intake port and a discharge passage, a main valve mounted in the casing having a measuring compartment and operable to alternately bring the measuring compartment into communication with the port and the discharge passage, and a non-drip auxiliary valve for the discharge passage.

2. The structure defined in claim 1 in which the auxiliary valve is in the form of a spout.

3. The structure defined in claim 1 in which the auxiliary valve is operated in conjunction with the main valve.

4. The structure defined in claim 1 in which the non-drip valve is attached to the main valve for movement therewith.

5. The structure defined in claim 1 in which the non-drip valve is carried by the main valve, and further including means on the main valve for opening the auxiliary valve in advance of the opening of the discharge passageway by said main valve and for closing the auxiliary valve following the closing of the discharge passage by the main valve.

6. The structure defined in claim 1 in which the non-drip valve is mounted to oscillate about the axis of the main valve, and further including means on the main valve for opening the auxiliary valve in advance of the opening of the discharge passageway by said main valve and for closing the auxiliary valve following the closing of the discharge passage by the main valve.

7. The structure defined in claim 1 in which the auxiliary valve is provided with a fixed arm pivoted to swing about the axis of the main valve, and further including means on the main valve for opening the auxiliary valve in advance of the opening of the discharge passageway by said main valve and for closing the auxiliary valve following the closing of the discharge passage by the main valve.

8. A device of the class described comprising a cylindrical valve casing having end plates, an intake port and a discharge passage, a tapered plug valve mounted in the casing having a measuring compartment and operable to alternately bring the measuring compartment into communication with the port and the discharge passage, one of said plates being fixed on the casing and the other on the valve, a handle on the end plate on the valve for oscillating said valve, a trunnion on the end plate on the valve at the axis thereof, a spring anchored in respect to the casing, bearing on the trunnion and under strain to seat the valve in the casing, an auxiliary valve for the discharge passage having an arm pivoted on the trunnion and supporting the auxiliary valve therefrom, and means on the main valve for opening and closing the auxiliary valve.

In testimony whereof I affix my signature.

ALBERT SLATEN.